(12) United States Patent
Kwon et al.

(10) Patent No.: US 8,610,840 B2
(45) Date of Patent: Dec. 17, 2013

(54) LIQUID CRYSTAL DISPLAY PANEL

(75) Inventors: HoKyoon Kwon, Seoul (KR); Yu-Jin Jeon, Seoul (KR)

(73) Assignee: Samsung Display Co., Ltd. (KR)

( * ) Notice: Subject to any disclaimer, the term of this patent is extended or adjusted under 35 U.S.C. 154(b) by 174 days.

(21) Appl. No.: 13/338,178

(22) Filed: Dec. 27, 2011

(65) Prior Publication Data

US 2012/0169986 A1   Jul. 5, 2012

(30) Foreign Application Priority Data

Dec. 30, 2010   (KR) ........................ 10-2010-0139483

(51) Int. Cl.
  *G02F 1/1333*   (2006.01)
  *G02F 1/1343*   (2006.01)
  *G02F 1/13*   (2006.01)
(52) U.S. Cl.
  USPC ................................ 349/54; 349/55; 349/192
(58) Field of Classification Search
  USPC ............................................ 349/54, 55, 192
  See application file for complete search history.

(56) References Cited

U.S. PATENT DOCUMENTS

| | | | | |
|---|---|---|---|---|
| 5,859,679 A * | 1/1999 | Song | ............................... | 349/54 |
| 6,930,743 B2 | 8/2005 | Park et al. | | |
| 7,034,905 B2 * | 4/2006 | Sah et al. | ........................ | 349/54 |
| 7,609,246 B2 * | 10/2009 | Hsu et al. | ........................ | 345/93 |
| 2011/0187955 A1 * | 8/2011 | Shih | ............................... | 349/54 |

FOREIGN PATENT DOCUMENTS

| | | |
|---|---|---|
| KR | 1020000066953 A | 11/2000 |
| KR | 10-0475837 B1 | 5/2003 |
| KR | 10-0450701 B1 | 7/2003 |

* cited by examiner

*Primary Examiner* — Edward Glick
*Assistant Examiner* — Mark Teets
(74) *Attorney, Agent, or Firm* — Innovation Counsel LLP (57) ABSTRACT

A display panel includes an array substrate including a plurality of connection lines extending from a plurality of signal lines and at least one repair line crossing the connection lines. An opposite substrate including a common electrode formed on a surface of the second substrate that is closest to the array substrate is coupled to the array substrate. The common electrode includes a plurality of openings that are positioned to align with a plurality of intersections between the connection lines and the repair line, thereby preventing an electrical coupling between the signal line and the common electrode.

16 Claims, 8 Drawing Sheets

LIQUID CRYSTAL DISPLAY PANEL

CROSS-REFERENCE TO RELATED APPLICATION

This application relies for priority upon Korean Patent Application No. 10-2010-0139483 filed on Dec. 30, 2010, the content of which is herein incorporated by reference in its entirety.

BACKGROUND

1. Field of Disclosure

The present invention relates to a display panel. More particularly, the present invention relates to a liquid crystal display panel capable of preventing a short circuit from forming between a common electrode and a signal line when a disconnected signal line is repaired.

2. Description of the Related Art

In general, a liquid crystal display panel includes an array substrate having pixels arranged thereon. Each pixel includes a data line, a thin film transistor connected with a gate line and the data line, and a pixel electrode connected to the thin film transistor.

Since the gate and data lines are often formed between pixels, the gate and data lines are formed in small dimensions, often having a magnitude of micro-meters or less. Accordingly, during the manufacturing of the array substrate, the lines may become accidentally disconnected.

The disconnected lines are repaired through a repair line. When the disconnected lines are repaired, a conductive protrusion is formed at the intersection of the disconnected line and the repair line. This conductive protrusion sometimes touches the common electrode that is formed on a substrate opposite to the array substrate, resulting in unintended electrical connection between the common electrode and the repaired signal line. This unintended connection can cause the liquid crystal display panel to malfunction.

SUMMARY

Exemplary embodiments of the present invention provide a display panel (e.g., a liquid crystal display panel) capable of preventing malfunctions caused by accidental disconnection of signal lines.

According to the exemplary embodiments, a display panel includes an array substrate and an opposite substrate coupled to the array substrate. The array substrate includes a first substrate having a display region and a peripheral region, a plurality of signal lines provided in the display region, a plurality of pixels connected with the signal lines, a plurality of connection lines provided in the peripheral region and extending from the signal lines, and at least one repair line crossing the connection lines. The opposite substrate includes a second substrate and a common electrode that is formed on a surface of the first substrate, the surface being closest to the array substrate. The common electrode includes a plurality of openings that are positioned to align with a plurality of intersections between the connection lines and the repair line. Due to the presence of the openings, even if a conductive protrusion is generated when the signal line is repaired, the conductive protrusion does not contact the common electrode and does not establish an electrical connection with the common electrode.

Each of the connection lines of the display panel may include a first connection line connected with one end of each signal line and a second connection line connected with an opposite end of the signal line. In addition, the repair line includes a first repair line crossing the first connection line and a second repair line crossing the second connection line.

The display panel may include a gate driver provided in the peripheral region to supply the gate signal to the gate lines, and a data driver provided in the peripheral region to supply the data signal to the data lines.

The data driver may include an amplifier to amplify the data signal and supply the data signal to the second repair line. Accordingly, RC delay occurring in the second repair line can be reduced.

In addition, the array substrate may further include a common voltage line formed in the peripheral region of the first substrate to supply the common voltage to the conductive spacer.

As described above, the openings are provided in the common electrode aligned with the intersections of the connection lines and at least one repair line. Accordingly, the signal line can be prevented from electrically being connected with the common electrode.

The openings may be spaced apart from each other, so that the common voltage can be uniformly supplied to the common electrode through the conductive spacer provided in the peripheral region.

The display may include a conductive spacer interposed between the array substrate and the opposite substrate and configured to deliver a common voltage to the common electrode.

BRIEF DESCRIPTION OF THE DRAWINGS

The above and other advantages of the present invention will become readily apparent by reference to the following detailed description when considered in conjunction with the accompanying drawings, wherein.

DETAILED DESCRIPTION

The present invention can be modified in various forms and may not be limited to the following embodiments but include various applications and modifications. The following embodiments are provided to clarify the technical spirit disclosed in the present invention and to sufficiently transmit the technical spirit of the present invention to a person of ordinary skill in this field. Therefore, the scope of the present invention should not be limited to the following embodiments. For example, although the examples provided are in the context of liquid crystal display panels, the invention may be adapted to other types of display panels.

When describing each attached drawing, similar reference numerals are designated as similar components. In addition, the size of the layers and regions of the attached drawings along with the following embodiments are simplified or exaggerated for precise explanation or emphasis and the same reference numeral represents the same component. The terms "first" and "second" are used for the purpose of explanation about various components, and the components are not limited to the terms "first" and "second." The terms "first" and "second" are only used to distinguish one component from another component. For example, a first component may be named as a second component without deviating from the scope of the present invention. Similarly, the second component may be named as the first component. The expression of the singular number in the specification includes the meaning of the plural number unless the meaning of the singular number is definitely different from that of the plural number in the context.

In the following description, the term "include" or "have" may represent the existence of a feature, a number, a step, an operation, a component, a part or the combination thereof described in the specification, and may not exclude the existence or addition of another feature, another number, another step, another operation, another component, another part or the combination thereof.

Hereinafter, an exemplary embodiment of the present invention will be described in more detail with reference to accompanying drawings.

Figure 1:
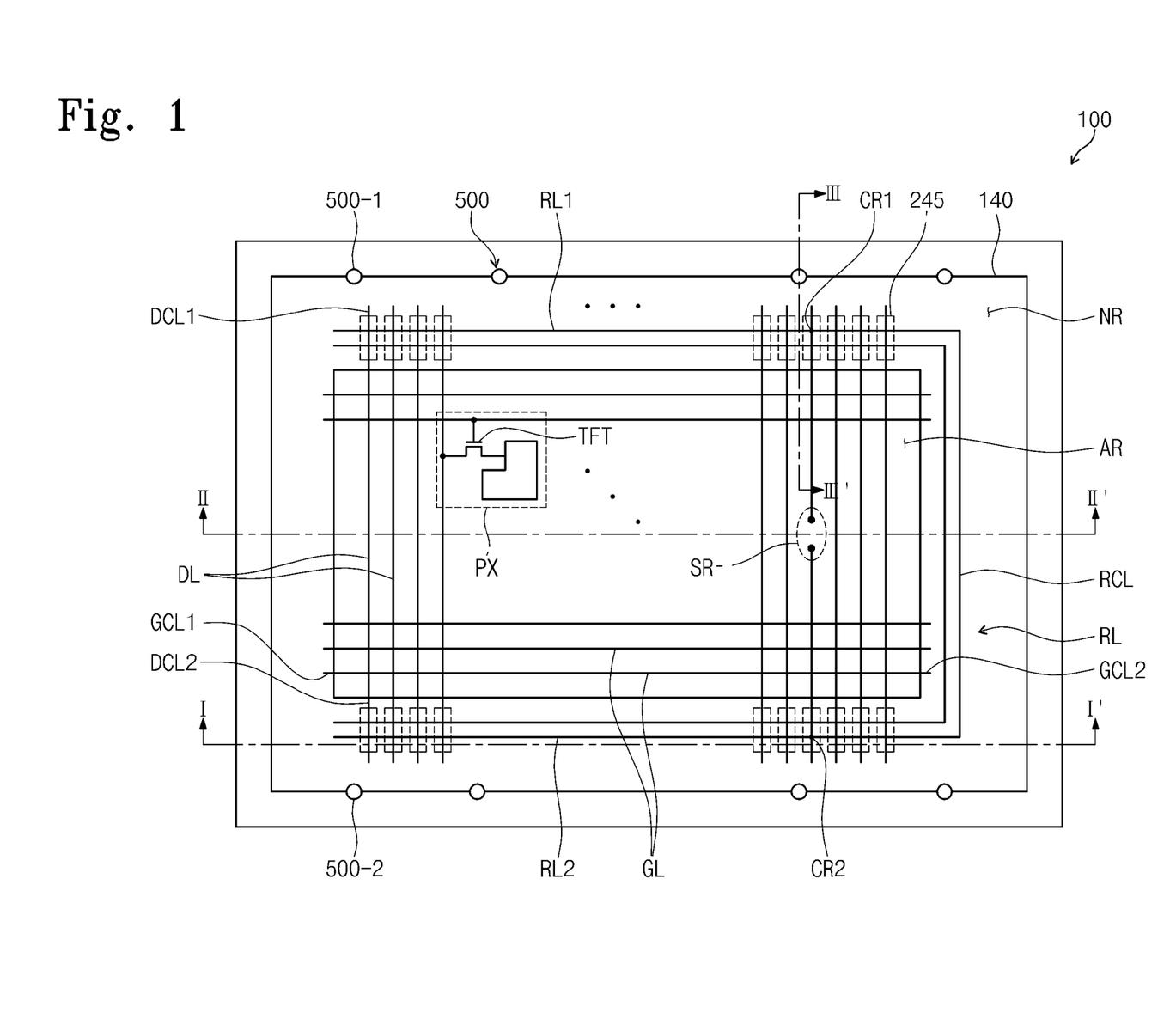
FIG. 1 is a plan view showing a liquid crystal display panel according to an exemplary embodiment of the present invention.
Figure 2:
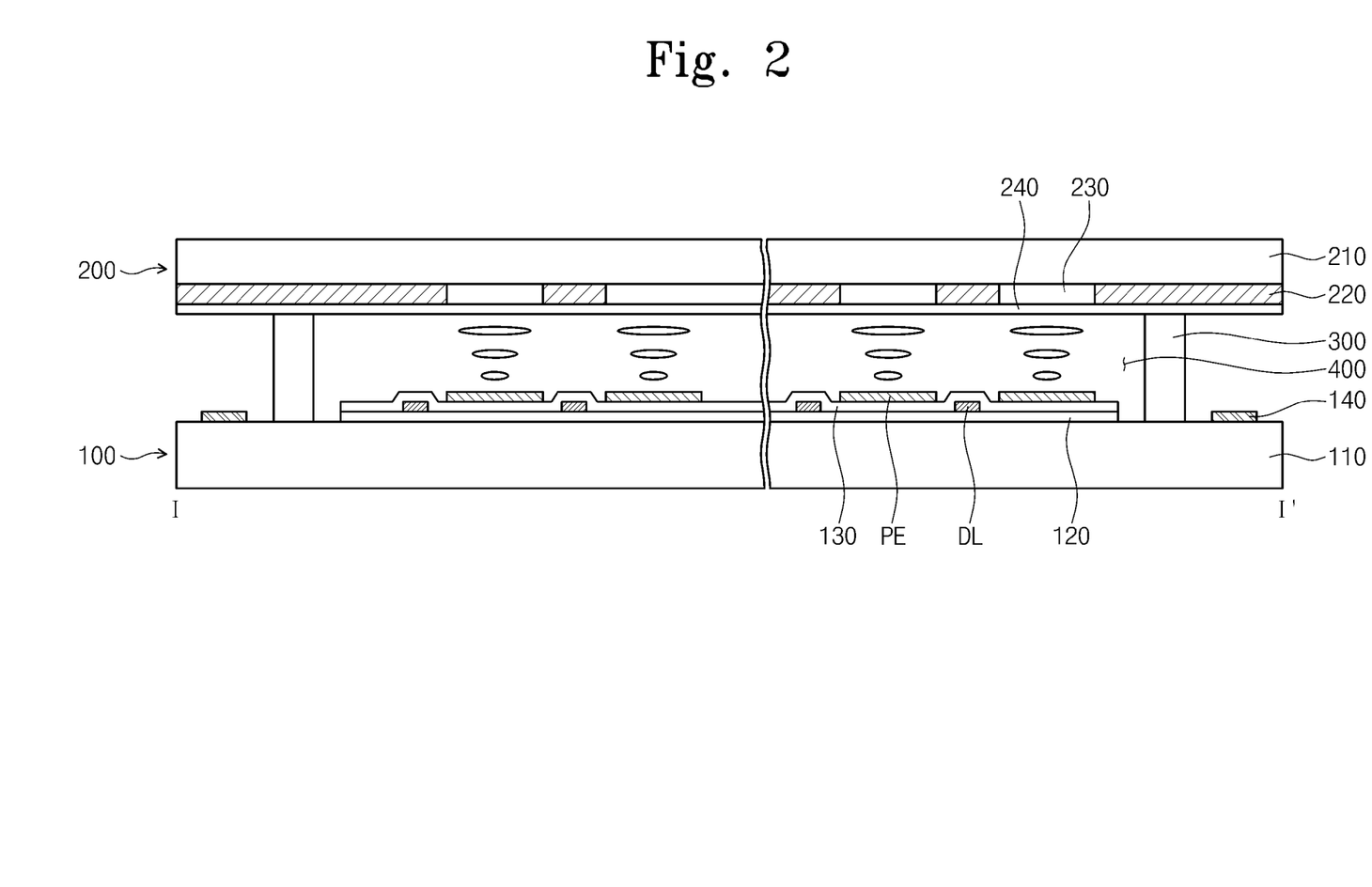
FIG. 2 is a sectional view taken along line I-I' of FIG. 1.
Figure 3:
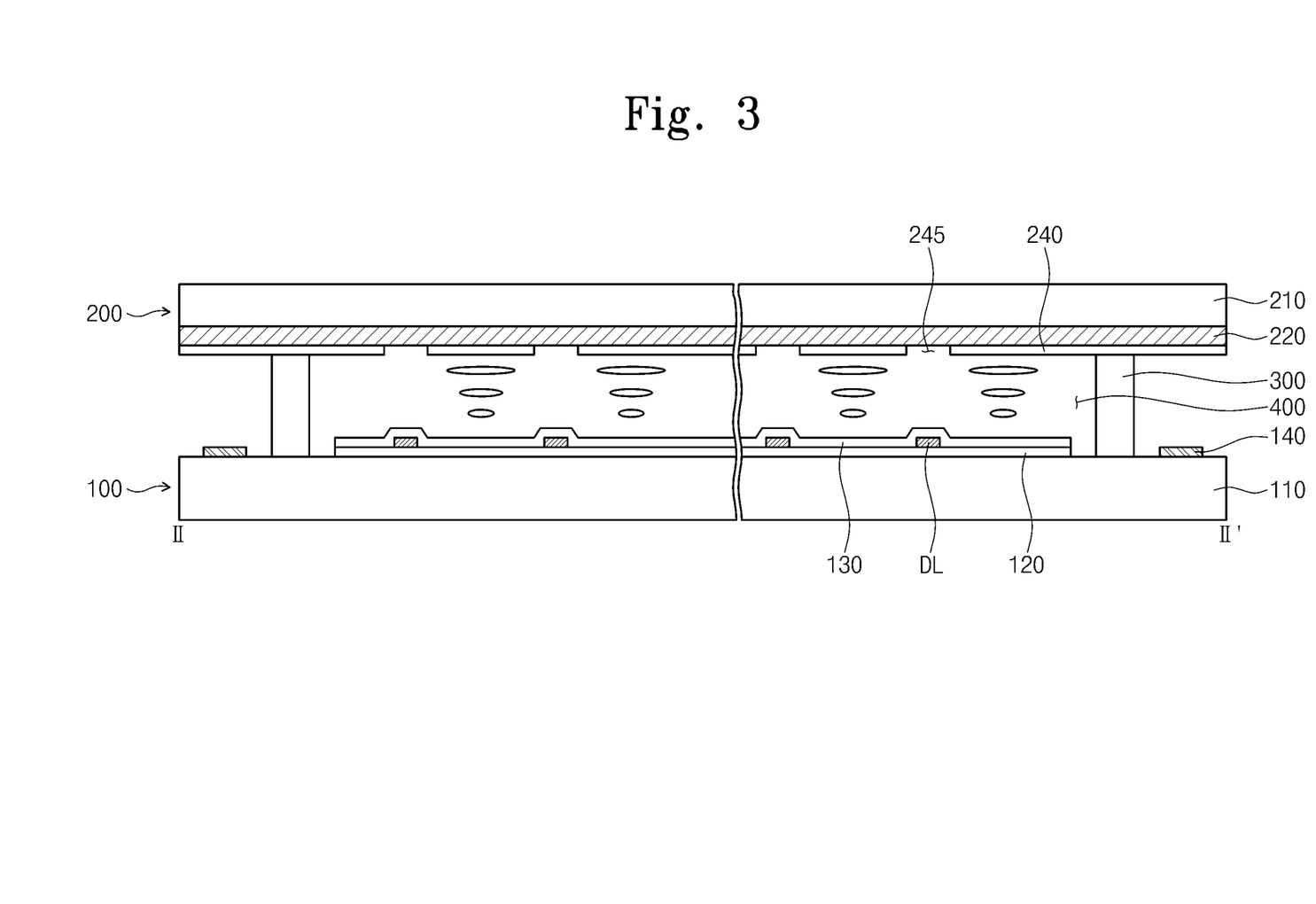
FIG. 3 is a sectional view taken along line II-II' of FIG. 1.
Figure 4:
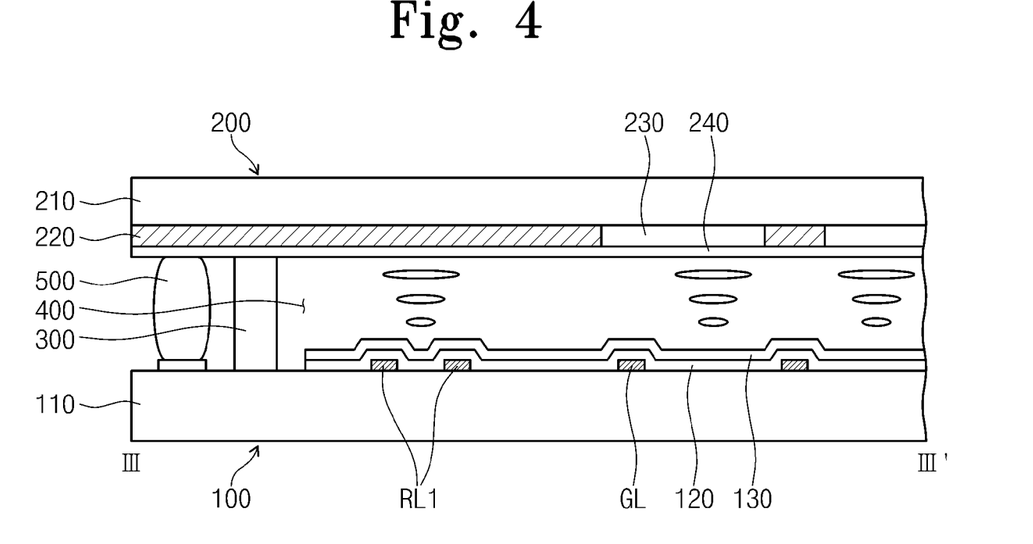
FIG. 4 is a sectional view taken along line III-III' of FIG. 1.

FIG. 1 is a plan view showing a liquid crystal display panel according to the present invention, and FIGS. 2 to 4 are sectional views showing one region of the liquid crystal display panel shown in FIG. 1. In FIG. 1, an opposite substrate is omitted in order to describe the structure of an array substrate of FIG. 1 in detail.

Referring to FIG. 1, the liquid crystal display panel includes an array substrate 100 to display an image, an opposite substrate 200 facing the array substrate 100, and a conductive spacer 500 interposed between the array substrate 100 and the opposite substrate 200 to deliver a common voltage applied from an external source to a common electrode.

The array substrate 100 includes a first substrate 110 defined by a display region AR and a peripheral region NR, a plurality of signal lines (e.g., gate lines. Data lines) formed on the first substrate 110, a plurality of pixels PX connected to the signal lines, a plurality of connection lines extending from the signal lines, and at least one repair line RL crossing the connection lines. Hereinafter, "cross" is intended to mean "cross with insulation," and indicates that there is no electrical connection between the crossing elements unless a connection is specifically mentioned.

The first substrate 110 includes a transparent member including a glass substrate, a plastic substrate, or a silicon substrate. The display region AR defined in the first substrate 110 receives light generated from a light source such as a backlight unit (not shown), and the peripheral region NR is adjacent to the display region AR.

The signal lines formed in the display region AR of the first substrate 110 include a plurality of gate lines GL and a plurality of data lines DL extending in directions perpendicular to each other. Pixel regions are defined in the form of a matrix by the gate lines GL and the data lines DL, and correspond to the pixels PX in one-to-one correspondence.

Hereinafter, one pixel PX will be representatively described in detail to avoid redundancy because the pixels PX have substantially the same structure and function. The same reference numbers will be assigned to the same elements. Each pixel PX includes a thin film transistor TFT to switch a pixel voltage corresponding to an image and a pixel electrode PE electrically connected with the thin film transistor TFT.

The thin film transistor TFT includes a gate electrode, an active layer, a source electrode, and a drain electrode. The gate electrode braches from an appropriate gate line GL among the gate lines GL formed on the first substrate 110, and includes aluminum-based metal or silver-based metal. The first substrate 110 is provided thereon with a gate insulating layer 120 including silicon nitride (SiNx) or silicon oxide (SiOx) to cover the gate lines GL and the gate electrode. The active layer is formed on the gate insulating layer 120 and includes hydrogenated amorphous silicon or polycrystalline silicon. The active layer is provided thereon with the source and drain electrodes spaced apart from each other at a predetermined distance so that the active layer may be exposed. In addition, the data line DL is formed on the gate insulating layer 120. The source electrode braches from the data line DL.

An ohmic contact layer, which includes silicide or N+ hydrogenated amorphous silicon heavily doped with N type dopants, may be interposed in various shapes such as an island shape or a line shape between the active layer and the source electrode or between the active layer and the drain electrode.

In addition, the gate insulating layer 120 is provided thereon with a protective layer 130 including an insulating layer to cover the source electrode, the drain electrode, and the exposed active layer. The protective layer 130 includes a material selected from the group consisting of an inorganic material including silicon nitride or silicon oxide, an organic material representing a superior planarization characteristic and photosensitivity, and a low-permittivity insulating material such as a-Si:C:O or a-Si:O:F formed through a plasma-enhanced chemical-vapor deposition (PECVD) scheme. In addition, the protective layer 130 may have a double-layer structure including an inorganic layer provided at a lower portion thereof and an organic layer provided at an upper portion thereof to protect the exposed active layer while representing a superior characteristic of the organic layer.

The protective layer 130 is provided therein with a contact hole (not shown) to expose a portion of the drain electrode. The protective layer 130 is provided thereon with the pixel electrodes PE, which are electrically connected with the drain electrode through the contact hole, corresponding to the pixels PX. The pixel electrodes PE include a transparent conductor including ITO (Indium Tin Oxide) or IZO (Indium Zinc Oxide) or a reflective conductor including aluminum. An alignment layer (not shown) may be coated on the pixel electrodes PE and the protective layer 130 to align liquid crystal molecules.

Connection lines extend from the signal lines in the peripheral region NR of the first substrate 110. The connection lines extending from the gate lines GL are defined as gate connection lines GCL (GCL1 and GLC2), and the connection lines extending from the data lines DL are defined as data connection lines DCL (DCL1 and DCL2). The gate connection lines GCL supply gate signals to the gate lines GL, and the data connection lines DCL supply data signals to the data lines DL. Typically, the connection lines are formed at the same time as the signal lines.

The gate connection lines GCL and the data connection lines DCL cross at least one repair line RL, although FIG. 1 only shows the data line DL crossing the repair line RL for simplicity of illustration. If one of the gate lines GL or one of the data lines DL is disconnected, the connection line extending from the disconnected gate line GL or the disconnected line DL is connected with the repair line RL.

Hereinafter, the data line DL and the data connection line DCL are described, with the understanding that the same configuration and principle may be applied to the gate line GL and the gate connection line GCL. FIG. 1 does not show the repair line RL crossing the gate connection lines GCL. In addition, although FIG. 1 shows the gate connection lines GCL with a short length, the gate connection lines GCL may extend with a longer length.

At least one repair line RL is formed in the peripheral region NR of the first substrate 110 to cross the connection lines. Although FIG. 1 shows two repair lines RL for simplicity of explanation, the number of repair lines RL may vary.

If one of the signal lines is disconnected, a signal applied to that signal line is not delivered to the rear of a disconnection region of the disconnected signal line. Hence, display failures occur in the liquid crystal display panel. As shown in FIG. 1, if a specific data line DL is disconnected at one position thereof, the data signal is not delivered to the data line DL provided at the rear of a disconnection region SR. This disconnection causes a line defect in the liquid crystal display panel. Since the repair line RL is formed on a plane different from that of the data connection lines DCL and crosses the data connection lines DCL in such a manner that the repair line RL is insulated from the data connection lines DCL, the repair line RL remains a dummy line (that does not transmit any signals) until the repair line RL is connected to a data line DL. If the specific data line DL is disconnected, the repair line RL is connected, via the data connection line DCL extending from the disconnected line DL, to establish an electrical connection between two disconnected parts of the data line DL in the disconnection region SR.

Each connection line includes a first connection line connected with a first end of the signal line and a second connection line connected with a second end of the signal line. As shown in FIG. 1, the data connection line DCL includes a first data connection line DCL1 and a second data connection line DCL2.

If a signal line is disconnected, one of the repair lines RL electrically connects the first and second portions of the disconnected line with each other. As used herein, a signal line, upon disconnection, has "a first portion" and "a second portion."

Referring to FIG. 1, a first repair line RL1 lies above the display region AR and a second repair line RL2 lies below the display region AR. As signal line disconnection is likely to occur somewhere in the display region AR (e.g., see disconnected region SR), the first repair line RL1 crossing the first connection line and the second repair line RL2 crossing the second connection line are positioned to connect to the first and second connection portions, respectively. During the repair process, the first connection portion is electrically connected with the first repair line RL1 through a laser welding process, and the second connection portion is electrically connected with the second repair line through the laser welding process.

As shown in FIG. 1, if a data line DL is disconnected, a first data connection line DCL1 extending from one end of the disconnected data line DL may be electrically connected with the first repair line RL1 through the laser welding process at the first intersection CR1, and a second data connection line DCL2 extending from an opposite end of the disconnected data line DL may be electrically connected with the second repair line RL2 through the laser welding process at a second intersection CR2. When the liquid crystal display panel is driven, the data signal is applied to one end of the data line DL through the data connection line DCL. Simultaneously, the data signal is applied to the first repair line RL1 through the first intersection CR1. The data signal applied to the first repair line RL1 is supplied to the second repair line RL2, and applied to the second connection portion of the data line DL at the second intersection CR2. Therefore, the data signal is supplied to a remaining region of the disconnected data line DL except for the disconnection region SR, and the line defect of the liquid crystal display panel is reduced to a dot defect.

Each repair line RL may further include a repair connection line connecting the first repair line RL1 with the second repair line RL2. The repair connection line RCL is formed in the peripheral region NR. The repair connection line RCL is formed on the same plane as that of the first and second repair lines RL1 and RL2, so that the repair connection line RCL can be insulated from the signal lines and the connection portions.

Figure 5:
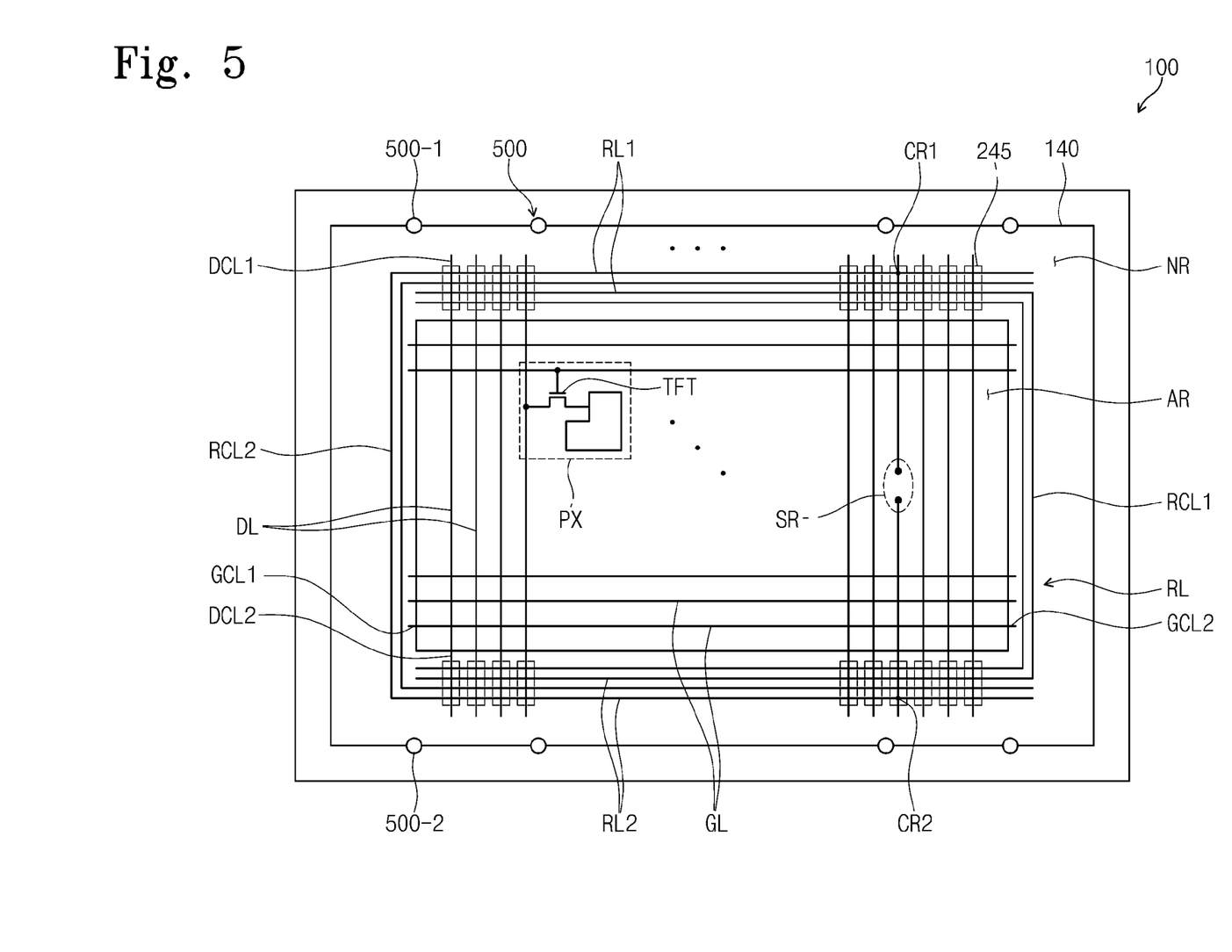
FIG. 5 is a plan view showing a liquid crystal display panel according to another exemplary embodiment of the present invention.

In addition, as shown in FIG. 5, when a plurality of repair lines RL are provided, repair connection lines RCL may include a plurality of first repair connection lines RCL1 and a plurality of second repair connection lines RCL2 positioned across the display region AR from each other. If the repair lines RL are formed only at one side of the peripheral region NR, the width of the peripheral region NR is increased to accommodate the repair lines RL. As shown in FIG. 5, if the repair connection lines RCL are divided into two groups on different sides of the display region AR, this increase in width of the peripheral region NR is avoided. In addition, since there is space between two adjacent repair connection lines RCL, the repair connection lines RCL are prevented from being shorted with respect to each other.

The opposite substrate 200 is provided above the array substrate 100. In this case, a coupling member 300 is interposed between the array substrate 100 and the opposite substrate 200 to couple the array substrate 100 with the opposite substrate 200. The coupling member 300 is formed in the peripheral region NR to surround the display region AR, and seals a liquid crystal layer 400 between the array substrate 100 and the opposite substrate 200. The liquid crystal layer 400 adjusts the transmittance of light supplied from the light source by an electric field formed between the common electrode and the pixel electrodes PX.

The opposite substrate 200 includes a second substrate 210 facing the first substrate 110 of the array substrate 100 and a common electrode 240 formed on one surface facing the first substrate 110.

The second substrate 210 may include the same material as the first substrate 110. The opposite substrate 200 may further include a light shielding member 220 called a black matrix and a color filter 230. The light shielding member 220 faces the pixel electrode PE formed on the array substrate 100, and has a plurality of opening regions having the same shape as that of the pixel electrode PE. The light shielding member 220 may include a single layer of chromium or a double layer of chromium (Cr) and chromium oxide, or may include an organic layer including black pigment.

A plurality of color filters 230 may be formed in the opening regions of the light shielding member 220. Each color filter 230 has a strip shape and faces the pixel electrode PE. In one embodiment, each color filter 230 represents a primary color such as red, green, and blue.

The common electrode 240 is formed on the light shielding member 220 and the color filter 230 to form an electric field with the pixel electrodes PE. In this case, the common electrode 240 has a plurality of openings 245. The openings 245 align with intersections CR (CR1 and CR2) of the connection portions and at least one repair line RL formed on the first substrate 110.

Since the common electrode 240 is removed from regions above the intersections CR, even if a conductive protrusion protrudes from one of the intersections CR, the signal lines do not get electrically connected to the common electrode 240.

As shown in FIGS. 1 and 5, if a data line DL is disconnected, the data connection lines DCL extending from the disconnected data line DL are connected with the repair lines RL through a laser welding process at the intersections CR. When the laser welding process is performed, a laser beam is irradiated at the rear of the arrays substrate 100. The data connection line DCL and the repair line RL provided at the intersection CR are melted together by a laser beam. In addition, the gate insulating layer 120 and the protective layer 130 provided at the intersection CR are melted together. The gate insulating layer 120 and the protective layer 130, which have been melted, protrude together with the data connection line DCL and the repair line RL to form a protrusion. Since the protrusion includes a conductive material constituting the data connection line DCL and the repair line RL, the protrusion has a conductive property. Even if the conductive protrusion projects to a height where it would have contacted the common electrode 240, the openings 245 provided above the intersections CR prevent this contact from happening, thereby avoiding electrically connection from being established between the signal line and the common electrode 240.

Since disconnection of the signal line may randomly occur among the signal lines and it is difficult to predict the exact location of the disconnection, the openings 245 are formed corresponding to the intersections CR of the connection lines and the repair line RL. Accordingly, the portion of the common electrode 240 covering the intersections CR are removed.

Figure 6:
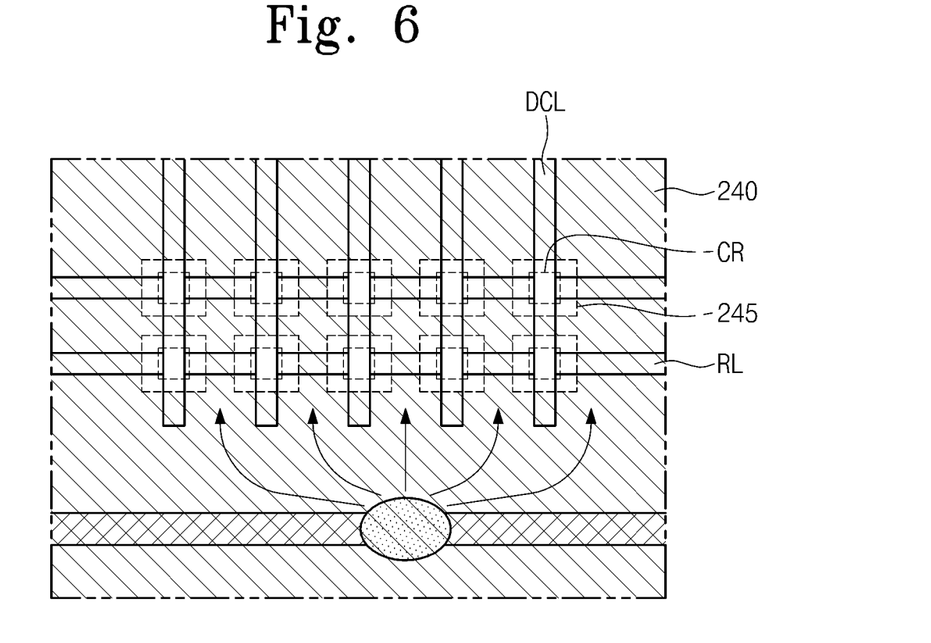
FIGS. 6 and 7 are enlarged plan views showing intersections of the liquid crystal display panel of FIG. 1.

Hereinafter, the openings 245 will be described in detail with reference to FIGS. 6 and 7. As shown in FIG. 6, the openings 245 may correspond to the intersections CR in a one-to-one correspondence. If the openings 245 correspond to the intersections CR in a one-to-one correspondence, a predetermined repair line RL is selected from the repair lines RL crossing the data connection line DCL extending from the disconnected data line DL, so that the disconnected data line DL can be repaired.

In addition, if the repair lines RL crossing the connection lines are provided in the peripheral region NR, the openings 245 may be provided to the connection lines in a one-to-one correspondence As shown in FIGS. 1 to 5, the conductive spacer 500 is interposed between the array substrate 100 and the opposite substrate 200 to deliver a common voltage to the common electrode 240. In the common electrode 240 having the openings 245, the solid region of the common electrode 240 between two adjacent openings 245 serves as a passage through which charges move. Accordingly, if the openings 245 correspond to the connection lines in a one-to-one correspondence, a plurality of passages are ensured, so that the common voltage provided from the outside is uniformly supplied to the common electrode 240 through the conductive spacer 500.

Meanwhile, the first substrate 110 may further include a common voltage line 140 to supply the common voltage to the conductive spacer 500. The common voltage line 140 may be provided in the peripheral region NR, and formed on the same plane as that of the gate line DL. In addition, the common voltage line 140 may form a closed-loop as depicted in FIG. 1.

If the common voltage line 140 is provided, the conductive spacer 500 further includes a plurality of first conductive spacers 500-1 and a plurality of second conductive spacers 500-2 facing the first conductive spacers 500-1 about the display region AR. Accordingly, the common voltage is supplied to the common electrode 240. In one embodiment, the first conductive spacers 500-1 are spaced from each other at one predetermined distance, and the second conductive spacers 500-2 are spaced from each other at another predetermined distance.

The conductive spacer 500 may be provided outside the repair lines RL. If the common voltage line 140 is provided outside the repair line RL, and if the conductive spacer 500 is interposed between the common voltage line 140 and the common electrode 240, the conductive spacer 500 is provided outside the repair line RL.

Figure 7:
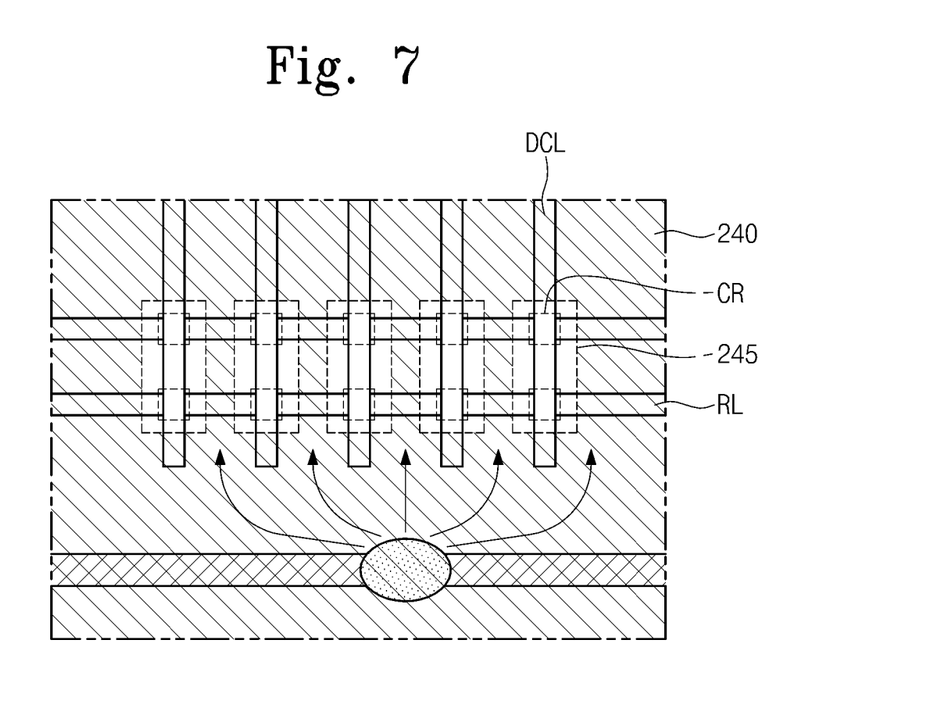

As shown in FIG. 7, when the openings 245 do not have a one-to-one correspondence to the data connection lines DCL, each opening 245 may be sized to expose all intersections CR between a data connection line DCL and the repair lines RL (see FIG. 7). If each opening 245 has a preset size, a predetermined repair line RL can be selected from the repair lines RL to repair the disconnected data line DL. In addition, the opening 245 can be more easily formed as compared with a case in which the openings 245 (see FIG. 6) are formed corresponding to the intersections CR in a one-to-one correspondence. In this case, the opening 245 may have a rectangular shape or an oval shape in order to cover the described object.

Figure 8:
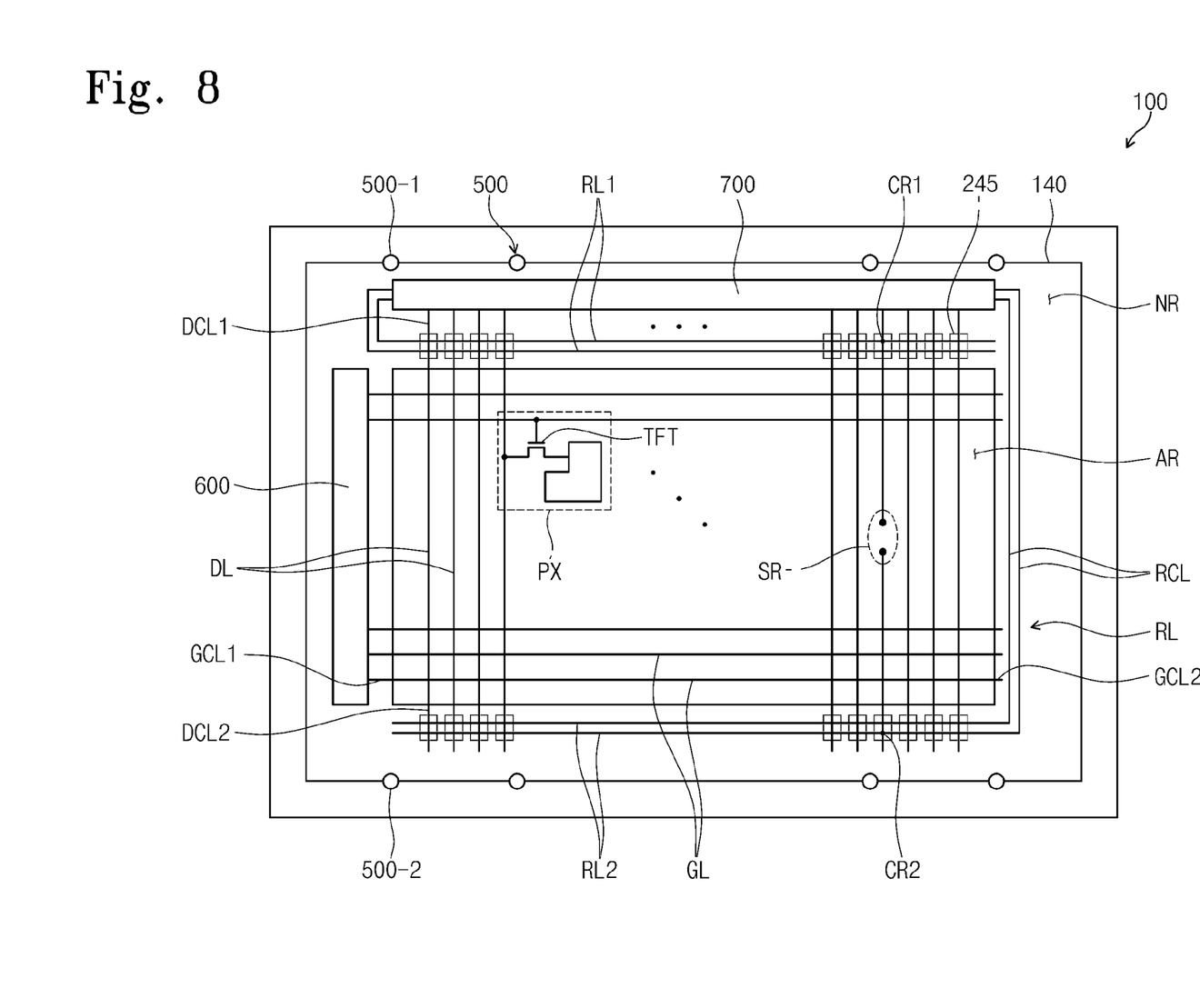
FIG. 8 is a plan view showing a liquid crystal display panel according to still another exemplary embodiment of the present invention.
Figure 9:
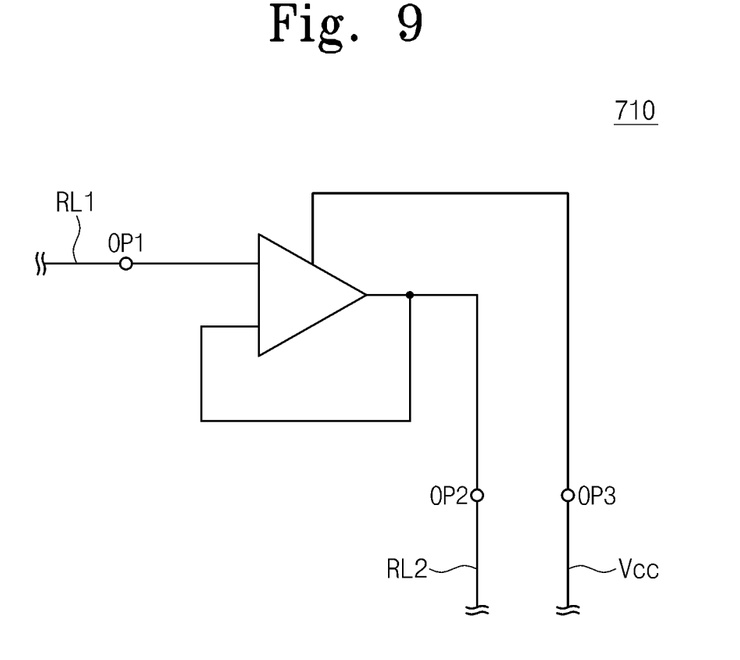
FIG. 9 is a circuit diagram showing an amplifier constituting a data driver of the liquid crystal display panel shown in FIG. 8.

FIG. 8 is a plan view showing a liquid crystal display panel according to still another exemplary embodiment of the present invention, and FIG. 9 is a circuit diagram showing an amplifier constituting a data driver of the liquid crystal display panel shown in FIG. 8. Hereinafter, the liquid crystal display panel according to the present exemplary embodiment will be described with reference to FIGS. 8 and 9. In the interest of avoiding redundancy, the structure and components that are substantially identical to those described with reference to FIGS. 1 and 7 will not be further described.

As shown in FIG. 8, the liquid crystal display panel includes a gate driver 600 provided in the peripheral region NR of the first substrate 110 to supply the gate signals to the gate lines GL and a data driver 700 provided in the peripheral region NR to supply data signals to the data lines DL.

The gate driver 600 may include a driver IC connected with the gate connection lines GCL. A gate driving circuit can be directly formed in the peripheral region NR during a thin film process of forming the pixels PX on the array substrate 100. In this case, the gate driver 600 may include two gate driving circuits (not shown) connected with the first and second gate connection lines GCL1 and GCL2.

The data driver 700 is connected with the data connection lines DL of the array substrate 100. The data driver 700 selects a grayscale voltage from the outside and applies the grayscale voltage to the data lines DL as a data signal. The data driver 700 may be integrated into the array substrate 100, mounted in the form of at least one driver IC on the array substrate 100, or mounted on an FPC (flexible printed circuit) film attached onto the array substrate 100.

The data driver 700 may further include an amplifier 710 to amplify the data signal to supply the data signal to the second repair line RL2. The number of amplifiers 710 may vary, and preferably corresponds to the number of the repair lines RL.

As shown in FIGS. 8 and 9, the amplifier 710 may include an operational amplifier. The operational amplifier includes an input terminal OP1 connected with one of the first repair lines RL1, an output terminal OP2 to output the data signal, and an enable terminal OP3 connected to a driving voltage terminal VCC of the data driver 700.

Before the data line DL is disconnected, the operational amplifier is disabled by the driving voltage of the data driver 700 applied through the enable terminal OP3. The operational amplifier receives a data signal applied to the disconnected data line DL through input terminal OP1. When the data signal is input through the input terminal OP1, the enable terminal OP3 of the operational amplifier is electrically disconnected from the driving voltage terminal VCC. Accordingly, the operational amplifier is enabled to amplify the data signal received through the input terminal OP1 and output the data signal through the output terminal OP3. The amplified data signal output from the operational amplifier is delivered to the second repair line RL2 and applied to the disconnected data line DL.

In this case, the repair line RL may further include a repair connection line RCL connecting the output terminal OP2 of the operational amplifier with the second repair line RL2 to deliver the amplified data signal to the second repair line RL2. The repair connection line RCL is formed in the peripheral region NR, and the number of repair connection lines RCL correspond to the number of the operational amplifiers.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display panel comprising:
    an array substrate comprising a first substrate having a display region and a peripheral region, a plurality of signal lines provided in the display region, a plurality of pixels connected with the signal lines, a plurality of connection lines provided in the peripheral region and extending from the signal lines, and at least one repair line crossing the connection lines; and
    an opposite substrate coupled to the array substrate and comprising a second substrate and a common electrode that is formed on a surface of the second substrate that is closest to the array substrate, the common electrode comprising a plurality of openings that are positioned to align with a plurality of intersections between the connection lines and the repair line.

2. The display panel of claim 1, wherein the openings correspond to the intersections in a one-to-one correspondence.

3. The display panel of claim 1, wherein a plurality of repair lines are provided such that the connection lines cross the repair lines, respectively, and the openings correspond to the connection lines in a one-to-one correspondence.

4. The display panel of claim 3, wherein the openings cover a plurality of intersections of the repair lines and the connection lines.

5. The display panel of claim 4, wherein each opening has a rectangular shape or an oval shape.

6. The display panel of claim 1, wherein each connection line comprises a first connection line connected with one end of a particular signal line and a second connection line connected with an opposite end of the particular signal line, and the repair line comprises a first repair line crossing the first connection line and a second repair line crossing the second connection line.

7. The display panel of claim 6, wherein the repair line further comprises a repair connection line formed in the peripheral region to electrically connect the first repair line to the second repair line.

8. The display panel of claim 7, wherein the repair line is provided in plurality and the repair connection line comprises first and second repair connection lines positioned across the display region from each other.

9. The display panel of claim 6, wherein the signal lines comprise a plurality of gate lines to supply a gate signal to the pixels and a plurality of data lines crossing the gate lines to supply a data signal to the pixels.

10. The display panel of claim 9, further comprising:
    a gate driver provided in the peripheral region to supply the gate signal to the gate lines; and
    a data driver provided in the peripheral region to supply the data signal to the data lines.

11. The display panel of claim 10, wherein the data driver comprises an amplifier to amplify the data signal and supply the data signal to the second repair line.

12. The display panel of claim 11, wherein the repair line further comprises a repair connection line to deliver the amplified data signal to the second repair line.

13. The display panel of claim 1, wherein the array substrate further comprises a common voltage line formed in the peripheral region of the first substrate to supply the common voltage, which is provided from the outside, to the conductive spacer.

14. The display panel of claim 13, wherein the conductive spacer comprises a plurality of first conductive spacers and a plurality of second conductive spacers positioned across the display region from the first conductive spacers.

15. The display panel of claim 14, wherein the first and second conductive spacers are provided between the repair line and the edge of the first substrate.

16. The display panel of claim 1 further comprising a conductive spacer interposed between the array substrate and the opposite substrate and configured to deliver a common voltage to the common electrode.

* * * * *